UNITED STATES PATENT OFFICE.

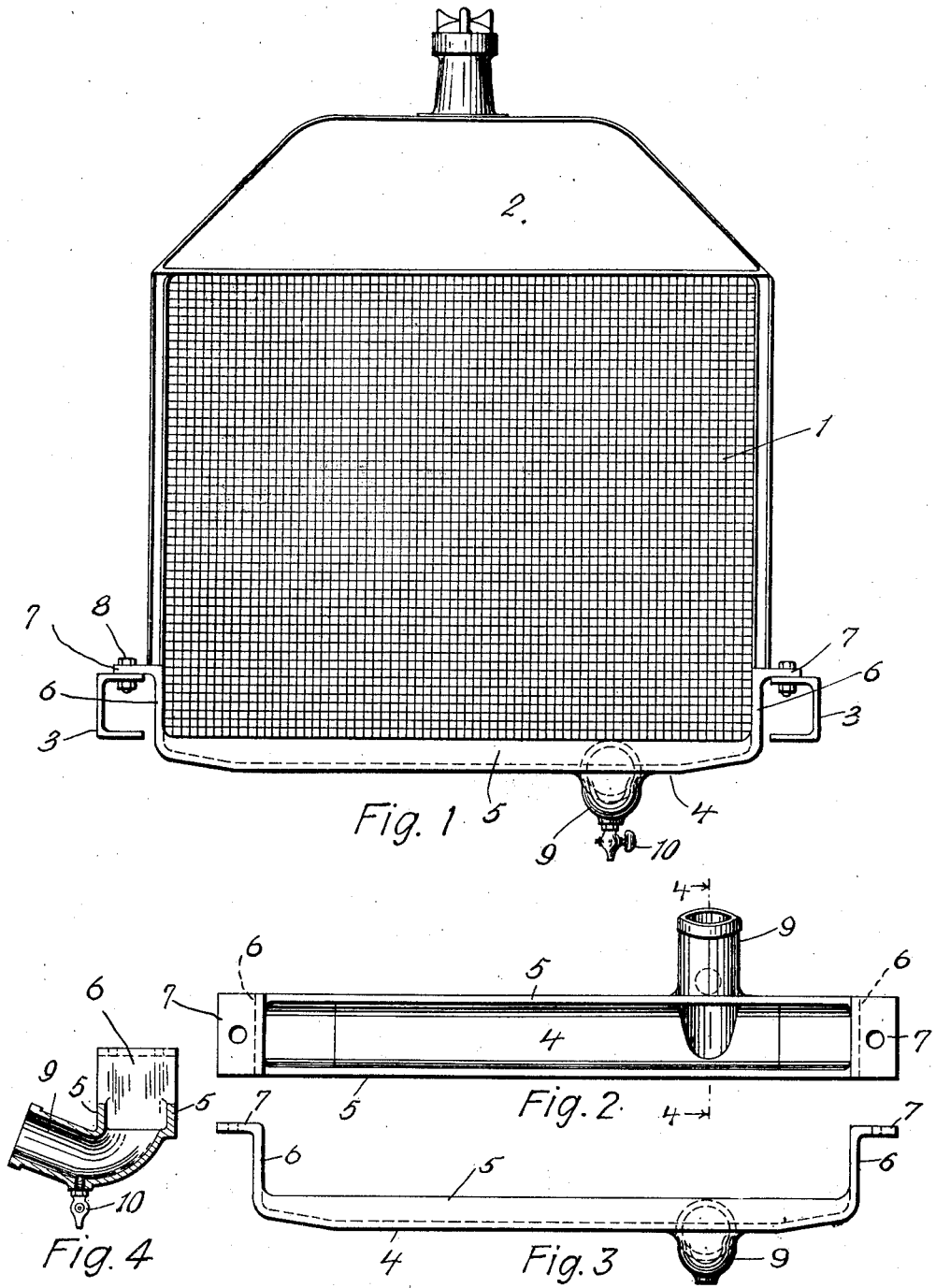

HENRY P. ARNDT, OF RICHMOND HILL, NEW YORK.

CROSS-BRACE RADIATOR-BASE AND RESERVOIR FOR MOTOR-VEHICLES.

1,355,803.  Specification of Letters Patent.  Patented Oct. 19, 1920.

Application filed July 5, 1919. Serial No. 308,690.

*To all whom it may concern:*

Be it known that I, HENRY P. ARNDT, residing at Richmond Hill, county of Queens, and State of New York, have invented certain new and useful Improvements in Cross-Brace Radiator-Bases and Reservoirs for Motor-Vehicles, of which the following is a specification.

This invention relates to radiators for automobile engines, having more particular reference to the construction of the radiator in relation to its mounting on the automobile chassis.

The invention has for an object to provide a radiator base of novel construction which forms part of the circulation system and at the same time forms a rigid cross brace connecting the ends of the main side frame members of the chassis.

For further comprehension of the invention, and of the objects and advantages thereof, reference will be had to the following description and accompanying drawings, and to the appended claims in which the various novel features of the invention are more particularly set forth.

Figure 1 of the drawings is a front view of a radiator having the invention embodied therein, the radiator being shown in position on the side frame members of an automobile chassis.

Fig. 2 is a plan view of the radiator base alone.

Fig. 3 is a front view of the radiator base alone.

Fig. 4 is a transverse section on the line 4—4 of Fig. 2.

The cellular body 1 and the upper portion 2 of the radiator may be of conventional design, the latter having the water circulation pipe connected thereto in the usual manner.

According to my invention the base of the radiator is constructed in a manner to act both as a rigid cross brace or yoke for the side frame members, indicated at 3 in Fig. 1, of the chassis and also to form part of the circulation system.

As here shown the base is in the form of a casting having a flat bottom 4 from the side edge of which the comparatively low flanges 5 project upwardly and form the ends of which the relatively higher walls 6 project upwardly, the base thus comprising a pan-like member into which the bottom of the cellular body 1 projects, the flanges 5 and 6 closely engaging the sides and ends of the body 1 and being sealed thereto by solder or the like. From the tops of the end walls 6 horizontal flanges 7 project outwardly and rest upon the side frame members 3 to which they are bolted as at 8.

Formed integral with the base of the radiator, and leading into the bottom 4 thereof is a short pipe length 9 which curves slightly upwardly and rearwardly and is adapted to have the lower circulation pipe of the radiator connected thereto. A drip cock may be provided in the lowest portion of the pipe 9 to drain the radiator when desired.

With my improved base construction the radiator provides a rigid cross brace for the frame members 3, the whole body of the radiator coöperating by reason of the wall members closely engaging the end walls of the radiator, in forming this rigid cross brace or yoke.

Having thus described my invention, what I claim as new and desire to secure by Letters Patent, is:

1. In a motor vehicle, in combination with the side frame members of the chassis, a radiator and a pan like radiator base forming a part of the radiator system and also forming a rigid cross brace between the said side frame members, said radiator setting within and closely engaging the inner side walls of said base.

2. In an automobile, in combination with the side frame members of the chassis, a radiator having its base portion forming a rigid cross brace between said side frame members, said base portion comprising a pan-like member having an integral pipe length leading into the bottom thereof.

3. In an automobile, in combination with the side frame members of the chassis, a radiator having its base in the form of a yoke hung between said side frame members, said yoke presenting end walls closely engaging the end walls of the radiator.

4. In an automobile, in combination with the side frame members of the chassis, a radiator having its base in the form of a casting comprising a substantially flat bottom having relatively low upstanding flanges at its sides and relatively low upstanding walls at its ends, said flanges and walls closely engaging the body of the radiator, the said walls having outturned flanges at their upper ends resting upon and secured to the said side frame members.

5. In an automobile, in combination with the side frame members of the chassis, a radiator having its base in the form of a casting comprising a substantially flat bottom having relatively low upstanding flanges at its sides and relatively low upstanding walls at its ends, said flanges and walls closely engaging the body of the radiator, the said walls having outturned flanges at their upper ends resting upon and secured to the said side frame members, the said casting having an integral pipe length leading into the bottom thereof.

In testimony whereof I have affixed my signature.

HENRY P. ARNDT.